US008238461B2

(12) United States Patent
Zhou et al.

(10) Patent No.: US 8,238,461 B2
(45) Date of Patent: Aug. 7, 2012

(54) APPARATUS FOR GENERATING PRECODING MATRIX CODEBOOK FOR MIMO SYSTEM AND METHOD OF THE SAME

(75) Inventors: Yongxing Zhou, Yongin-si (KR); Bruno Clerckx, Yongin-si (KR); Goochul Chung, Seoul (KR); David J. Love, West Lafayette, IN (US); Il Han Kim, Geumwang-eup (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1193 days.

(21) Appl. No.: 11/967,556

(22) Filed: Dec. 31, 2007

(65) Prior Publication Data

US 2008/0225962 A1   Sep. 18, 2008

(30) Foreign Application Priority Data

Mar. 16, 2007   (KR) .................. 10-2007-0026338

(51) Int. Cl.
*H04B 7/02* (2006.01)
(52) U.S. Cl. ........ 375/267; 375/260; 375/262; 375/265; 375/316
(58) Field of Classification Search .................. 375/260, 375/267, 262, 295, 316; 370/203, 204, 205, 370/208, 209, 210
See application file for complete search history.

(56) References Cited

U.S. PATENT DOCUMENTS 5,852,630 A * 12/1998 Langberg et al. ............. 375/219
7,428,269 B2 * 9/2008 Sampath et al. .............. 375/267
7,630,886 B2 * 12/2009 Zhang et al. .................. 704/222
7,917,176 B2 * 3/2011 Khojastepour et al. ..... 455/562.1
2006/0039493 A1   2/2006 Mukkavilli et al.
2007/0049218 A1   3/2007 Gorokhov et al.
2007/0174038 A1 * 7/2007 Wang et al. ....................... 704/1
2008/0037675 A1 * 2/2008 Lin et al. ........................ 375/262
2008/0159425 A1 * 7/2008 Khojastepour et al. ....... 375/260

FOREIGN PATENT DOCUMENTS

KR   2006-130806   12/2006
WO   WO 2006/018689   2/2006

OTHER PUBLICATIONS

International Search Report issued in PCT Application No. PCT/KR2008/000801 on May 20, 2008.
W. Dai et al., "On the Information Rate of MIMO Systems with Finite Rate Channel State Feedback Using Beamforming and Power On/Off Strategy," arXiv:cs.IT/0603040 v1, Mar. 9, 2006.
"Frequency Domain Adaptive Precoding for E-UTRA MIMO," R1-062189, presented by Motorola at the 3GPP TSG RAN WG1 Meeting #46, in Tallinn, Estonia, Aug. 28-Sep. 1, 2006 (3rd Generation Partnership Project, Technical Specification Group Radio Access Networks, Working Group 1).

* cited by examiner

*Primary Examiner* — Dhaval Patel
(74) *Attorney, Agent, or Firm* — NSIP Law

(57) ABSTRACT

An apparatus for generating a precoding matrix codebook includes a matrix group generator to generate a first group of unitary matrices based on a vector-based codebook for precoding of a multiple input multiple output (MIMO) communication scheme; a matrix group extender to extend the first group of unitary matrices to generate a second group of unitary matrices; and a matrix group selector to select a group of columns corresponding to a communication rank from each of the unitary matrices that are elements of the second group so that the columns are optimized based on a distance between the columns corresponding to the communication rank.

21 Claims, 6 Drawing Sheets

FIG. 3

$$N_t \times (N_t-1) \qquad N_t \times (N_t-1) \qquad (N_t-1) \times (N_t-1)$$

$$\begin{bmatrix} \phantom{xx} \odot \phantom{xx} \end{bmatrix} = \begin{bmatrix} \phantom{xx} \odot \phantom{xx} \end{bmatrix} \times \begin{bmatrix} \text{UNITARY} \end{bmatrix}$$

310      320      330

APPARATUS FOR GENERATING PRECODING MATRIX CODEBOOK FOR MIMO SYSTEM AND METHOD OF THE SAME

CROSS-REFERENCE TO RELATED APPLICATIONS

This application claims the benefit of Korean Patent Application No. 2007-26338 filed on Mar. 16, 2007, in the Korean Intellectual Property Office, the disclosure of which is incorporated herein by reference in its entirety.

BACKGROUND OF THE INVENTION

1. Field of the Invention

Aspects of the invention relate to wireless data communication, and more particularly to precoding in a multiple input multiple output (MIMO) communication system.

2. Description of the Related Art

Precoding may be a process to assign appropriate users to each spatial beam in a multiple input multiple output (MIMO) communication system. Precoding also may be a process to assign appropriate streams to each spatial beam in single user MIMO communication system.

A vector or a matrix corresponding to each spatial beam exists in a precoding codebook. The greater a distance between spatial beams specified by the vector or the matrix, the more the communication quality of wireless communication can be improved.

Research on the above subject has been ongoing. Papers describing the result of such research have recently been published, such as the paper entitled "Frequency Domain Adaptive Precoding for E-UTRA MIMO," R1-062189, presented by Motorola at the 3GPP TSG RAN WG1 Meeting #46, in Tallinn, Estonia, Aug. 28-Sep. 1, 2006 (3rd Generation Partnership Project, Technical Specification Group Radio Access Networks, Working Group 1).

Generally, in a MIMO communication system in which a number of receiving antennas is the same as a number of transmitting antennas and the receiving antennas are symmetrical to the transmitting antennas, a regular matrix-based codebook is widely used. Also, in a MIMO communication system in which the number of transmitting antennas is different from the number of receiving antennas and the receiving antennas are asymmetrical to the transmitting antennas, a vector-based codebook is widely used. In a MIMO communication system in which only one stream is transmitted to a UE, a vector codebook may be used.

However, in the case of the matrix-based codebook, it is difficult to calculate distance between matrices in a codebook. Also, in the case of the vector-based codebook, it is difficult to support a multi-rank system in order to improve a communication quality.

Accordingly, there is a need for a method that can more effectively generate a codebook in a precoding procedure for a MIMO communication system.

SUMMARY OF THE INVENTION

Aspects of the invention relate to a method and apparatus for generating a precoding matrix codebook that can emphasize advantages of a vector-based precoding codebook, and extend a vector-based codebook to a precoding matrix codebook adaptable to a multi-rank system.

Other aspects of the invention also provide a method and apparatus for generating a precoding matrix codebook that can provide a group of optimized beam vectors in a multiple input multiple output (MIMO) communication system.

According to an aspect of the invention, an apparatus for generating a precoding matrix codebook includes a matrix group generator to generate a first group of unitary matrices based on a vector-based codebook for precoding of a multiple input multiple output (MIMO) communication scheme; a matrix group extender to extend the first group of unitary matrices to generate a second group of unitary matrices; and a matrix group selector to select a group of columns corresponding to a communication rank from each of the unitary matrices that are elements of the second group so that the selected columns are optimized based on a distance between the columns corresponding to the communication rank.

According to an aspect of the invention, a method of generating a precoding matrix codebook includes generating a first group of unitary matrices based on a vector-based codebook for precoding of a multiple input multiple output (MIMO) communication scheme; extending the first group of unitary matrices to generate a second group of unitary matrices; and selecting a group of columns corresponding to a communication rank from each of the unitary matrices that are elements of the second group so that the columns are optimized based on a distance between the columns corresponding to the communication rank.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which:

FIG. 3 shows a predetermined mathematical manipulation performed by a matrix group extender of a precoding matrix codebook generating apparatus according to an aspect of the invention;

DETAILED DESCRIPTION OF THE EMBODIMENTS

Figure 1:
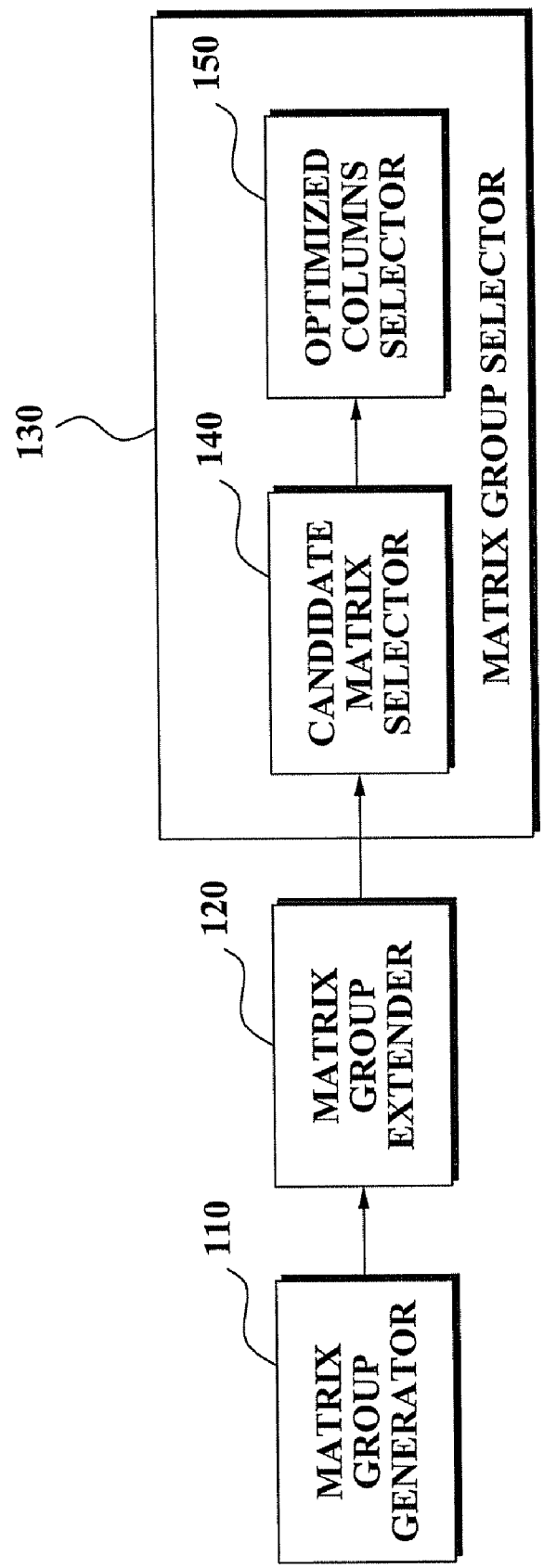
FIG. 1 is a block diagram of an apparatus for generating a precoding matrix codebook according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

FIG. 1 is a block diagram of an apparatus for generating a precoding matrix codebook according to an aspect of the invention.

Referring to FIG. 1, a precoding matrix codebook generating apparatus according to an aspect of the invention includes a matrix group generator 110, a matrix group extender 120, and a matrix group selector 130.

The matrix group generator 110 generates a first group of unitary matrices based on a vector-based codebook for precoding of a multiple input multiple output (MIMO) communication scheme.

A vector-based codebook generally specifies a group of at least one vector having a dimension of N×1, where N is a natural number. The matrix group generator 110 generates a unitary matrix from the at least one vector to generate the first group of unitary matrices. When the vector has a dimension of N×1, the unitary matrix that is generated has a dimension of N×N.

A first column of a unitary matrix that is an element of the first group may be identical to a vector that is an element of the vector-based codebook, or a normalized form of the vector that is an element of the vector-based codebook.

When G is a number of elements of the vector-based codebook, and $p_i$ is the normalized form of the vector that is an element of the vector-based codebook, a relationship between $U_i$, which is a unitary matrix generated from $p_i$, and $p_i$ is represented by the following Equation 1:

$$U_i \cdot p_i^H = [1,0,0,\ldots,0]^H (i=1,\ldots,G) \quad (1)$$

Also, the unitary matrix that is an element of the first group may be obtained by performing a singular value decomposition (SVD) with respect to the vector that is an element of the vector-based codebook, or the normalized form of the vector that is an element of the vector-based codebook. In this case, a relationship between $U_i$ and $p_i$ is represented by the following Equation 2:

$$U_i \Sigma V_i^H = p_i \quad (2)$$

When $p_i$ is an N×m matrix, $U_i$ is an N×N unitary matrix, $\Sigma$ corresponding to an N×m matrix has non-negative numbers on a main diagonal has 0s outside the main diagonal, and $V_i^H$ is a Hermitian matrix of an m×m unitary matrix $V_i$. Generally, in $\Sigma_i$, i is used to put a greater value in front. In this case, $\Sigma$ is uniquely determined based on $p_i$.

The vector-based codebook may have a distribution in which vectors that are elements of the vector-based codebook maximize a minimum distance between the vectors.

The vectors that are elements of the vector-based codebook may be obtained by Grassmannian line packing (GLP), which is an example of a method of obtaining a distribution in which a minimum distance between the vectors is maximized.

Also, the matrix group extender 120 extends the first group of unitary matrices to generate a second group of unitary matrices.

The matrix group extender 120 generates a group of new unitary matrices by performing a predetermined mathematical manipulation with respect to the unitary matrices that are elements of the first group. Also, the matrix group extender 120 generates a greater number of new unitary matrices than the number of unitary matrices in the first group by repeating the mathematical manipulation with respect to the new unitary matrices. The new unitary matrices make up a second group of unitary matrices.

The second group of unitary matrices may include a unitary matrix that is an element of the first group.

Figure 2:
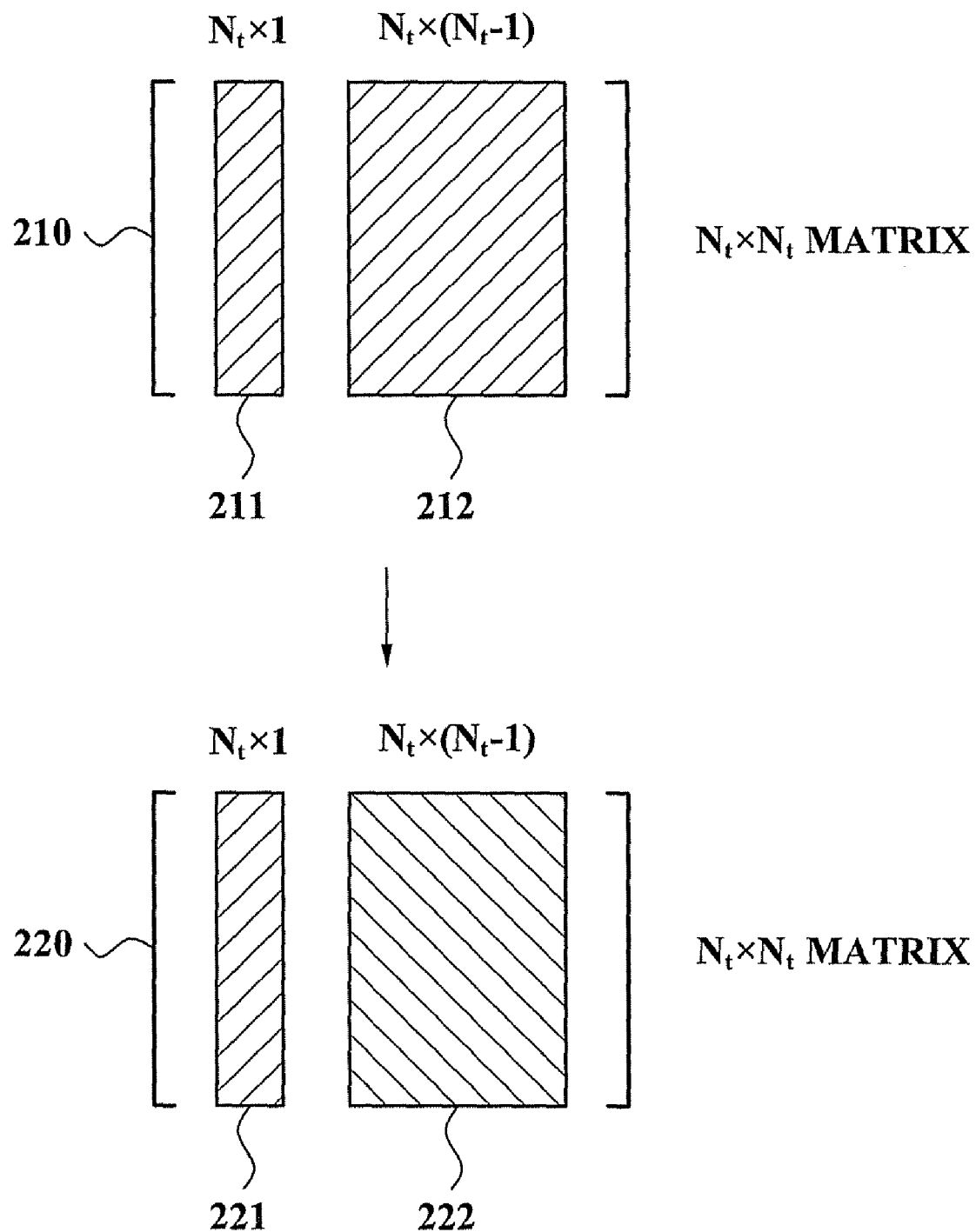
FIG. 2 shows a predetermined mathematical manipulation performed by a matrix group extender of a precoding matrix codebook generating apparatus according to an aspect of the invention.

FIG. 2 shows a predetermined mathematical manipulation performed by a matrix group extender of a precoding matrix codebook generating apparatus according to an aspect of the invention.

Referring to FIG. 2, the matrix group extender of the precoding matrix codebook generating apparatus according to an aspect of the invention generates a second group so that a first column 221 of an $N_t \times N_t$ unitary matrix 220 that is an element of the second group is identical to a first column 211 of an $N_t \times N_t$ unitary matrix 210 that is an element of a first group, and remaining columns 222 of the $N_t \times N_t$ unitary matrix 220 that is an element of the second group are orthogonal to the first column 211 of the $N_t \times N_t$ unitary matrix 210 that is an element of the first group.

Remaining columns 212 of the $N_t \times N_t$ unitary matrix 210 are also orthogonal to the first column 211, and thus the unitary matrix 210 that is an element of the first group may be an element of the second group.

When an any set of columns of a unitary matrix that is an element of the first group is identical to a vector that is an element of the vector-based codebook, or a normalized form of the vector that is an element of the vector-based codebook, the matrix group extender 120 may select the set of columns as reference columns.

FIG. 3 shows a predetermined mathematical manipulation performed by a matrix group extender of a precoding matrix codebook generating apparatus according to an aspect of the invention.

Referring to FIG. 3, the matrix group extender of the precoding matrix codebook generating apparatus obtains an $N_t \times (N_t-1)$ matrix 310 that consists of remaining columns of an $N_t \times N_t$ unitary matrix that is an element of a second group excluding a first column of the $N_t \times N_t$ unitary matrix that is an element of the second group by multiplying an arbitrary $(N_t-1) \times (N_t-1)$ unitary matrix 330 by an $N_t \times (N_t-1)$ matrix 320 that consists of remaining columns of an $N_t \times N_t$ unitary matrix that is an element of a first group excluding a first column of the $N_t \times N_t$ unitary matrix that is an element of the first group.

Even though the $N_t \times (N_t-1)$ matrix 320 is multiplied by the arbitrary $(N_t-1) \times (N_t-1)$ unitary matrix 330, orthogonality with the first column of the $N_t \times N_t$ unitary matrix that is an element of the first group may be maintained. The procedure of multiplying the arbitrary $(N_t-1) \times (N_t-1)$ unitary matrix 330 by the $N_t \times (N_t-1)$ matrix 320 that consists of remaining columns of the $N_t \times N_t$ unitary matrix that is an element of the first group may be a procedure of rotating the $N_t \times (N_t-1)$ matrix 320 within a null space for the first column of the $N_t \times N_t$ unitary matrix that is an element of the first group.

A MIMO communication system in which a number of transmitting antennas is Tx and a number of receiving antennas is Rx may have a maximum communication rank that is a smallest number among Tx and Rx. For example, if Tx is 4 and Rx is 2, a maximum communication rank is 2.

When a vector-based codebook is optimized with respect to a communication rank of 1 and thereby has a chordal distance d, a first column of a unitary matrix that is identical to an original vector may also be optimized and thereby the set of the first column has the same chordal distance d. Also, as is well known, when a group of unitary matrices is optimized with respect to a first m number of columns and thereby has a chordal distance d, remaining columns of the unitary matrices may also be optimized and thus have the same chordal distance d.

Accordingly, when a maximum possible communication rank is $N_t$, and an initial vector-based codebook is optimized with respect to a communication rank of 1, the same chordal distance d may be obtained even by the unitary matrix of the first group with respect to a communication rank of 1 or ($N_t-1$).

However, when the communication rank is greater than or equal to 2 and less than (Nt−1), the optimized chordal distance d may not be obtained by the unitary matrix of the first group. However, according to an aspect of the invention, the matrix group extender may obtain the optimized chordal distance d through a predetermined mathematical manipulation even when the communication rank is greater than or equal to 2 and less than ($N_t-1$).

As described above, the procedure of multiplying the arbitrary ($N_t-1$)×($N_t-1$) unitary matrix 330 by the $N_t$×($N_t-1$) matrix 320 consisting of the remaining columns of the $N_t$×$N_t$ unitary matrix that is an element of the first group may be a procedure of rotating the $N_t$×($N_t-1$) matrix 320 within a null space for the first column of the $N_t$×$N_t$ unitary matrix that is an element of the first matrix.

Through the rotating procedure within the null space, when the communication rank is greater than or equal to 2 and less than ($N_t-1$), various candidate matrices may be obtained by changing a distance between columns corresponding to the communication rank. An optimized communication performance may be obtained by maximizing the distance between the columns and selecting a matrix with a maximum chordal distance.

The arbitrary ($N_t-1$)×($N_t-1$) unitary matrix 330 may be obtained through a random process.

In the case of a unitary matrix obtained through the above process, the distance between columns corresponding to the communication rank may also be randomly distributed, and thus the above-described method may effectively accomplish an aspect of the invention that is to obtain various candidate matrices by changing the distance between the columns corresponding to the communication rank.

A method of obtaining a random ($N_t-1$)×($N_t-1$) unitary matrix may be a method of generating a random ($N_t-1$)×1 vector and performing an SVD with respect to the random ($N_t-1$)×1 vector to obtain a random ($N_t-1$)×($N_t-1$) unitary matrix.

Referring again to FIG. 1, the matrix group selector 130 selects a group of columns corresponding to a communication rank from each of the unitary matrices that are elements of the second group so that the selected columns are optimized based on a distance between the columns corresponding to the communication rank.

When the communication rank is greater than or equal to 2 and less than ($N_t-1$), the second group rather than the first group may have various types of distributions with respect to the distance between the columns corresponding to the communication rank. Accordingly, a group of columns optimized in the second group based on a distance between the columns corresponding to the communication rank may have an improved communication performance that is better than a communication performance of a group of columns optimized in the first group.

Referring again to FIG. 1, the matrix group selector 130 may include an optimized columns selector 150 to select the group of columns corresponding to the communication rank from each of the unitary matrices that are elements of the second group so that the selected columns maximize a distance between the columns corresponding to the communication rank. The optimized columns selector 150 is shown with dashed lines in FIG. 5 to indicate that it may be omitted according to other aspects of the invention.

Generally, when a distance between columns included in a precoding codebook is maximized, the communication performance may be optimized.

Figure 4:
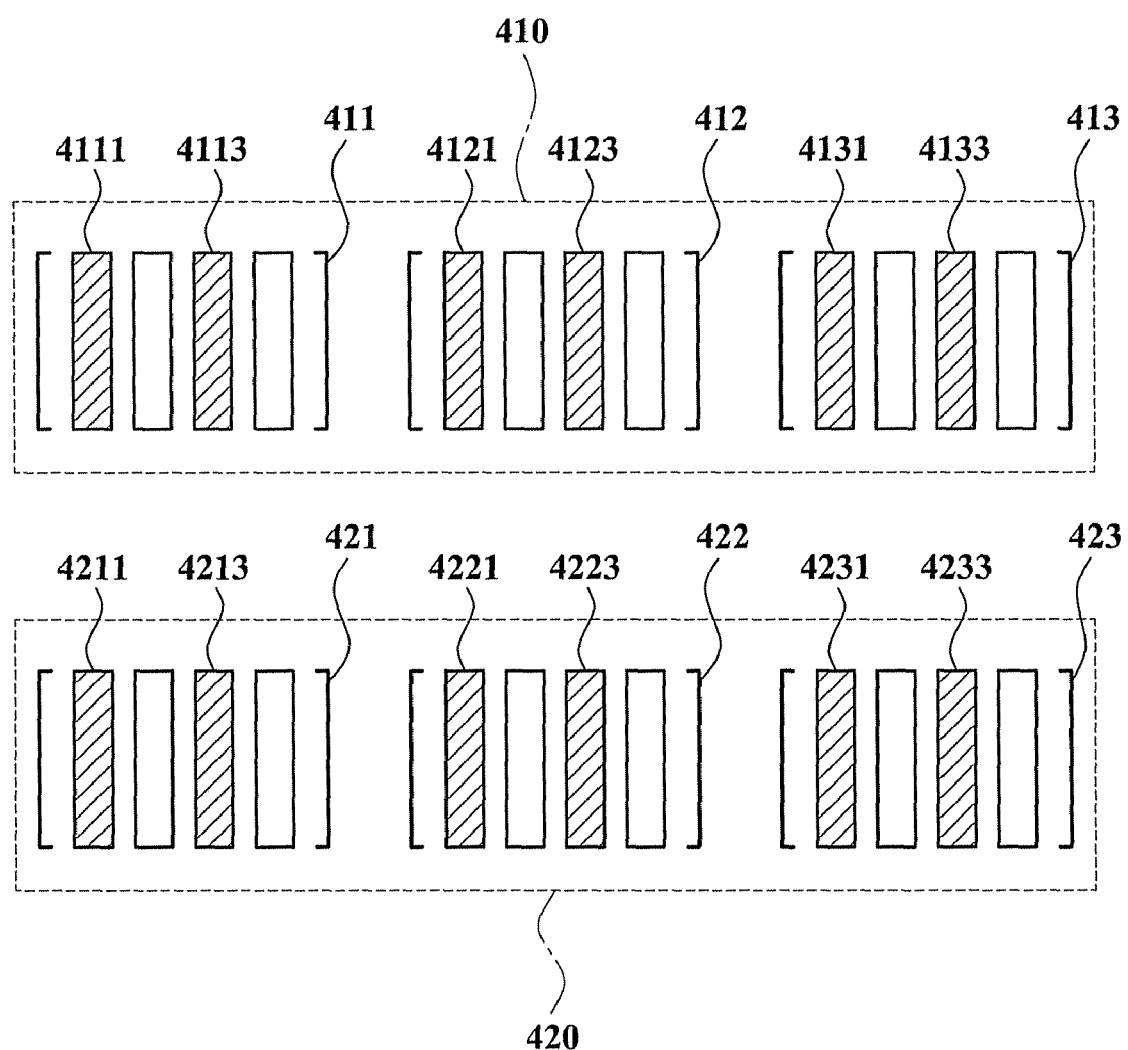
FIG. 4 shows a predetermined selection procedure performed by a matrix group selector of a precoding matrix codebook generating apparatus according to an aspect of the invention.

FIG. 4 shows a predetermined selection procedure performed by a matrix group selector of a precoding matrix codebook generating apparatus according to an aspect of the invention.

Referring to FIG. 4, the matrix group selector of the precoding matrix codebook generating apparatus according to an aspect of the invention selects a group of optimized unitary matrices from a first 4×4 unitary matrix group 410 and a second 4×4 unitary matrix group 420. The unitary matrices are optimized based on a distance between columns corresponding to a communication rank. Also, the first 4×4 unitary matrix group 410 is obtained from the elements of the first group, and the second 4×4 unitary matrix group 420 is obtained from the first 4×4 unitary matrix group 410.

When the communication rank is 2, the matrix group selector calculates a distance between columns with respect to any set of two columns of each matrix as follows.

As an example, with respect to the first unitary matrix group 410, the matrix group selector may calculate a distance among a first 4×2 matrix consisting of a first column 4111 and a third column 4113 of a first matrix 411, a second 4×2 matrix consisting of a first column 4121 and a third column 4123 of a second matrix 412, and a third 4×2 matrix consisting of a first column 4131 and a third column 4133 of a third matrix 413. Also, with respect to the second unitary matrix group 420, the matrix group selector may calculate a distance among a first 4×2 matrix consisting of a first column 4211 and a third column 4213 of a first matrix 421, a second 4×2 matrix consisting of a first column 4221 and a third column 4223 of a second matrix 422, and a third 4×2 matrix consisting of a first column 4231 and a third column 4233 of a third matrix 423.

The matrix group selector finally selects a unitary matrix group having a minimum distance among the 4×2 matrices described above from the first unitary matrix group 410 and the second unitary matrix group 420. Also, the matrix group selector finally selects a group of three 4×2 matrices that consist of a first column and a third column of the selected unitary matrix group.

Referring again to FIG. 1, a matrix group selector 130 according to an aspect of the invention may include a candidate matrix selector 140 to select a predetermined number of candidate matrices from unitary matrices that are elements of the second group so that the candidate matrices maximize a distance between first columns of the candidate matrices, and an optimized columns selector 150 to select the group of columns corresponding to the communication rank from the predetermined number of candidate matrices so that the selected columns maximize a distance between the columns corresponding to the communication rank. The candidate matrix selector 140 and the optimized columns selector 150 are shown with dashed lines in FIG. 5 to indicate that they may be omitted according to other aspects of the invention.

Figure 5:
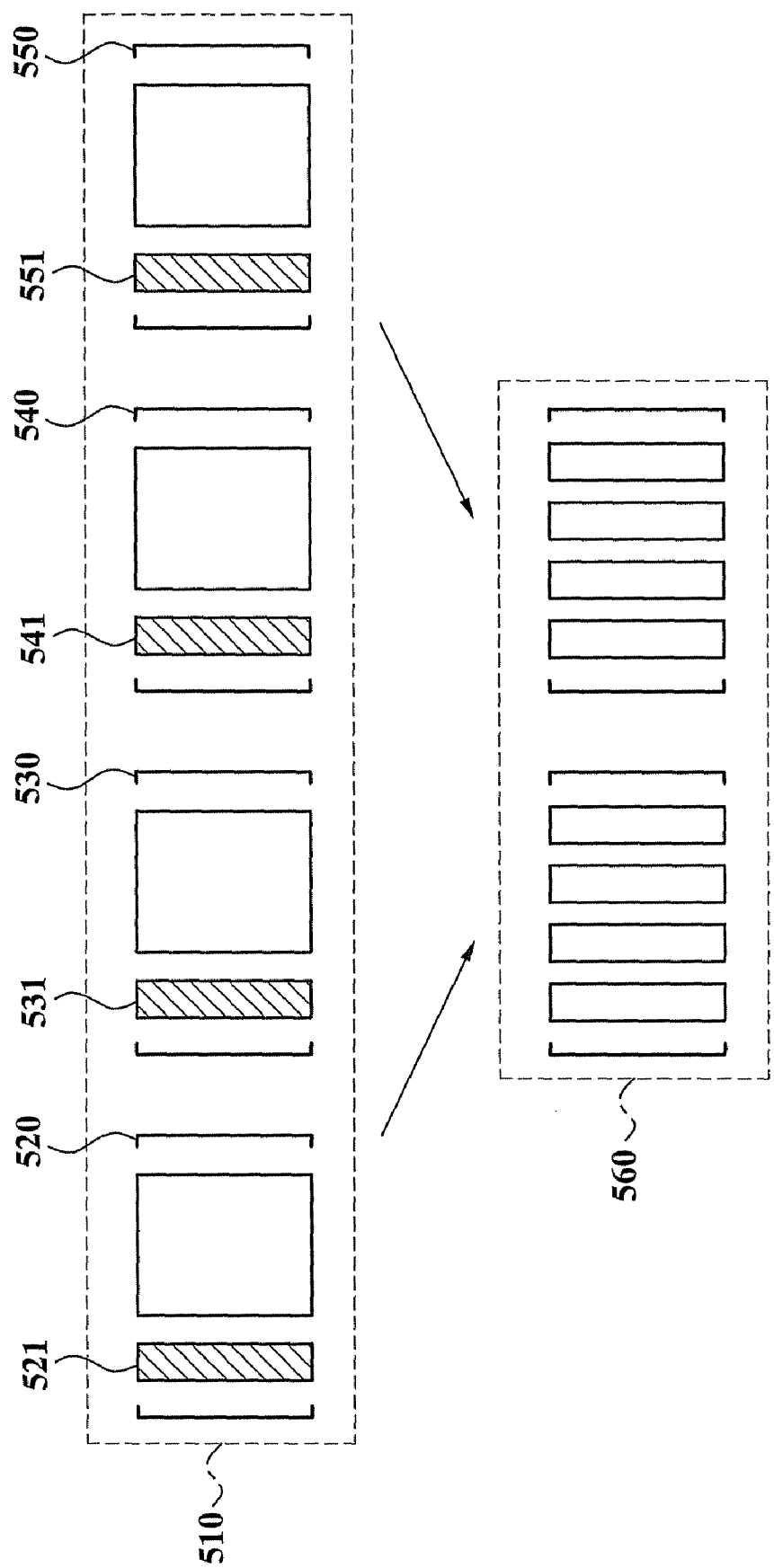
FIG. 5 shows a predetermined selection procedure performed by a candidate matrix selector of a precoding matrix codebook generating apparatus according to an aspect of the invention.

FIG. 5 shows a predetermined selection procedure performed by a candidate matrix selector of a precoding matrix codebook generating apparatus according to an aspect of the invention.

Referring to FIG. 5, the candidate matrix selector of the precoding matrix codebook generating apparatus according to an aspect of the invention calculates a distance among first columns 521, 531, 541, and 551 of unitary matrices 520, 530, 540, and 550 that are four elements of a second group 510, and selects two unitary matrices 520 and 550 having a maximum distance from the unitary matrices 520, 530, 540, and 550.

A number of the selected candidate matrices, such as 2 in the example shown in FIG. 5, may be a predetermined value. The number of the selected candidate matrices may be restricted by an amount of information that can be fed back from a terminal. The restriction is represented by the following Equation 3:

$$\log_2\{G + L \times (C_{Tx}^2 + C_{Tx}^3 + \ldots + C_{Tx}^{rank\_max})\} \leq FBI(\text{bits}) - 1 \quad (3)$$

Here, G is the number of elements of the vector-based codebook, L is the number of the selected candidate matrices, Tx is a number of transmitting antennas, $C_{Tx}^i$ denotes a number of combinations of i element in a set of Tx elements, i is a communication rank, rank_max is a maximum communication rank, and FBI is the total amount of feedback bits.

The optimized columns selector selects a group of columns corresponding to a communication rank. In the example shown in FIG. 5, the columns are selected from the columns of selected candidate matrices 560 so that the selected columns maximize a distance between the columns corresponding to the communication rank.

Also, a method of generating a precoding matrix codebook according to an aspect of the invention includes generating a first group of unitary matrices based on a vector-based codebook for precoding of a MIMO communication scheme; extending the first group to generate a second group of unitary matrices; and selecting a group of columns corresponding to a communication rank, wherein the columns are selected from each of the unitary matrices that are elements of the second group, and the columns are optimized based on a distance between the columns corresponding to the communication rank.

Figure 6:
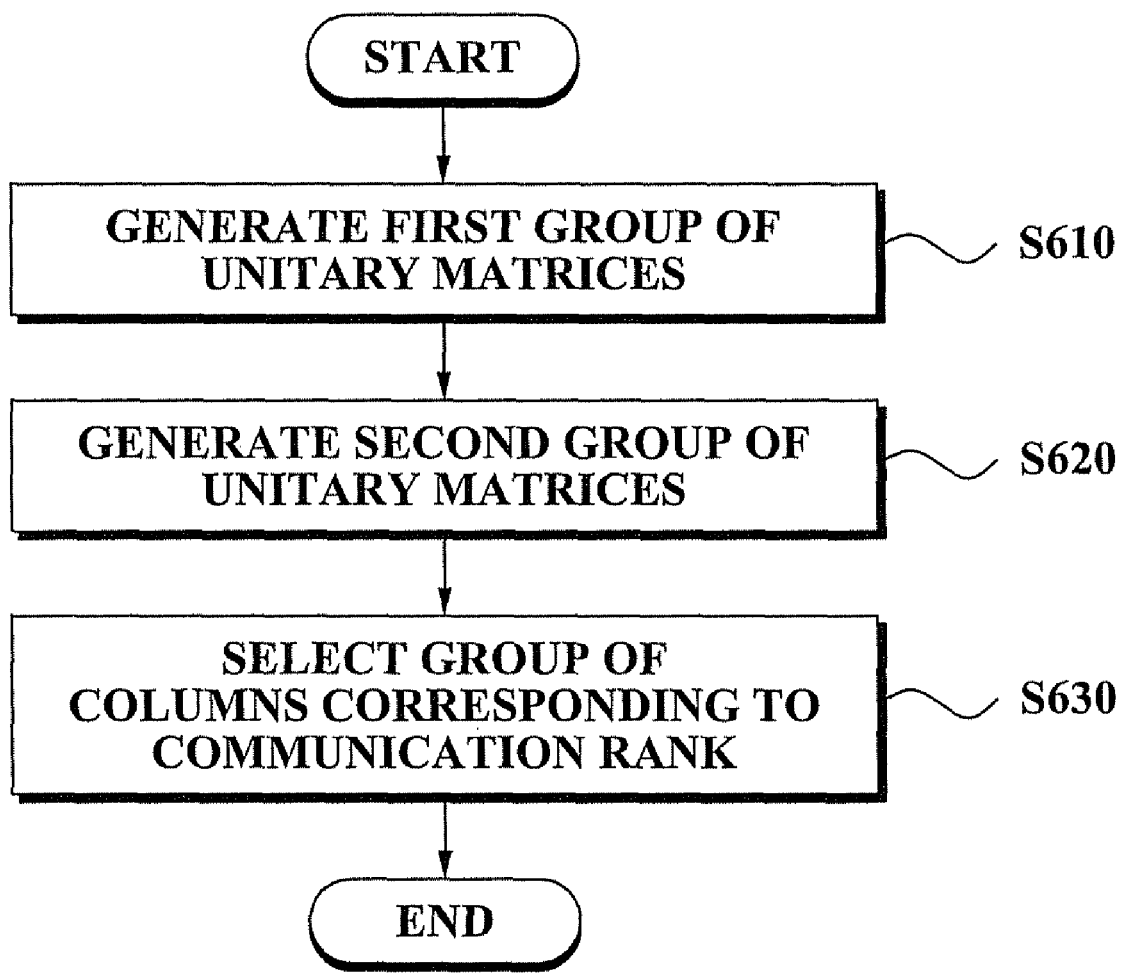
FIG. 6 is a flowchart of a method of generating a precoding matrix codebook according to an aspect of the invention.

FIG. 6 is a flowchart of a method of generating a precoding matrix codebook according to an aspect of the invention.

Referring to FIG. 6, in operation S610, a precoding matrix codebook generating method according to an aspect of the invention generates a first group of unitary matrices based on a vector-based codebook for precoding of a MIMO communication scheme.

A vector-based codebook generally specifies a group of at least one vector having a dimension of N×1, where N is a natural number. The precoding matrix codebook generating method generates a unitary matrix from the at least one vector to generate the first group of unitary matrices. When the vector has a dimension of N×1, the unitary matrix that is generated has a dimension of N×N.

A first column of a unitary matrix that is an element of the first group may be identical to a vector that is an element of the vector-based codebook, or a normalized form of the vector that is an element of the vector-based codebook.

When G is a number of elements of the vector-based codebook, and $p_i$ is the normalized form of the vector that is an element of the vector-based codebook, a relationship between $U_i$, which is a unitary matrix generated from $p_i$, and $p_i$ is represented by Equation 1 described above.

Also, the unitary matrix that is an element of the first group, may be obtained by performing a singular value decomposition (SVD) with respect to the vector that is an element of the vector-based codebook, or the normalized form of the vector that is an element of the vector-based codebook. In this case, a relationship between $U_i$ and $p_i$ is represented by Equation 2 described above.

The vector-based codebook may have a distribution in which vectors that are elements of the vector-based codebook maximize a minimum distance between the vectors.

The vectors that are elements of the vector-based codebook may be obtained by Grassmannian line packing (GLP), which is an example of a method of obtaining a distribution in which a minimum distance between the vectors is maximized.

In operation S620, the precoding matrix codebook generating method extends the first group of unitary matrices to generate a second group of unitary matrices.

The precoding matrix codebook generating method generates a group of new unitary matrices by performing a predetermined mathematical manipulation with respect to the unitary matrices that are elements of the first group. Also, the precoding matrix codebook generating method generates a greater number of new unitary matrices than the number of unitary matrices in the first group by repeating the mathematical manipulation with respect to the new unitary matrices. The new unitary matrices make up a second group of unitary matrices.

The second group of unitary matrices may include a unitary matrix that is an element of the first group.

FIG. 2 shows a predetermined mathematical manipulation performed by a precoding matrix codebook generating method according to an aspect of the invention.

Referring to FIG. 2, the precoding matrix codebook generating method according to an aspect of the invention generates a second group so that a first column 221 of an $N_t \times N_t$ unitary matrix 220 that is an element of the second group is identical to a first column 211 of an $N_t \times N_t$ unitary matrix 210 that is an element of a first group, and remaining columns 222 of the $N_t \times N_t$ unitary matrix 220 that is an element of the second group are orthogonal to the first column 211 of the $N_t \times N_t$ unitary matrix 210 that is an element of the first group.

Remaining columns 212 of the $N_t \times N_t$ unitary matrix 210 are also orthogonal to the first column 211, and thus the unitary matrix 210 that is an element of the first group may be an element of the second group.

FIG. 3 shows a predetermined mathematical manipulation performed by a precoding matrix codebook generating method according to an aspect of the invention.

Referring to FIG. 3, the precoding matrix codebook generating method obtains an $N_t \times (N_t - 1)$ matrix 310 that consists of remaining columns of an $N_t \times N_t$ unitary matrix that is an element of a second group excluding a first column of the $N_t \times N_t$ unitary matrix that is an element of the second group by multiplying an arbitrary $(N_t - 1) \times (N_t - 1)$ unitary matrix 330 by an $N_t \times (N_t - 1)$ matrix 320 that consists of remaining columns of an $N_t \times N_t$ unitary matrix that is an element of a first group excluding a first column of the $N_t \times N_t$ unitary matrix that is an element of the first group.

Even though the $N_t \times (N_t - 1)$ matrix 320 is multiplied by the arbitrary $(N_t - 1) \times (N_t - 1)$ unitary matrix 330, orthogonality with the first column of the $N_t \times N_t$ unitary matrix that is an element of the first group may be maintained. The procedure of multiplying the arbitrary $(N_t - 1) \times (N_t - 1)$ unitary matrix 330 by the $N_t \times (N_t - 1)$ matrix 320 that consists of remaining columns of the $N_t \times N_t$ unitary matrix that is an element of the first group may be a procedure of rotating the $N_t \times (N_t - 1)$ matrix 320 within a null space for the first column of the $N_t \times N_t$ unitary matrix that is an element of the first group.

A MIMO communication system in which a number of transmitting antennas is Tx and a number of receiving antennas is Rx may have a maximum communication rank that is a smallest number among Tx and Rx. For example, if Tx is 4 and Rx is 2, a maximum communication rank is 2.

When a vector-based codebook is optimized with respect to a communication rank of 1 and thereby has a chordal distance d, a first column of a unitary matrix that is identical to an original vector may also be optimized and thereby the unitary matrix has the same chordal distance d. Also, as is well known, when a group of unitary matrices is optimized with respect to a first m number of columns and thereby has a chordal distance d, remaining columns of the unitary matrices may also be optimized and thus have the same chordal distance d.

Accordingly, when a maximum possible communication rank is $N_t$, and an initial vector-based codebook is optimized with respect to a communication rank of 1, the same chordal distance d may be obtained even by the unitary matrix of the first group with respect to a communication rank of 1 or $(N_t-1)$.

However, when the communication rank is greater than or equal to 2 and less than $(N_t-1)$, the optimized chordal distance d may not be obtained by the unitary matrix of the first group. However, according to an aspect of the invention, the precoding matrix codebook generating method may obtain the optimized chordal distance d through a predetermined mathematical manipulation even when the communication rank is greater than or equal to 2 and less than $(N_t-1)$.

As described above, the procedure of multiplying the arbitrary $(N_t-1) \times (N_t-1)$ unitary matrix 330 by the $N_t \times (N_t-1)$ matrix 320 consisting of the remaining columns of the $N_t \times N_t$ unitary matrix that is an element of the first group may be a procedure of rotating the $N_t \times (N_t-1)$ matrix 320 within a null space for the first column of the $N_t \times N_t$ unitary matrix that is an element of the first group.

Through the rotating procedure within the null space, when the communication rank is greater than or equal to 2 and less than $(N_t-1)$, various candidate matrices may be obtained by changing a distance between columns corresponding to the communication rank. An optimized communication performance may be obtained by maximizing the distance between the columns and selecting a matrix with a maximum chordal distance.

The arbitrary $(N_t-1) \times (N_t-1)$ unitary matrix 330 may be obtained through a random process.

In the case of a unitary matrix obtained through the above process, the distance between columns corresponding to the communication rank may also be randomly distributed, and thus the above-described method may effectively accomplish an aspect of the invention that is to obtain various candidate matrices by changing the distance between the columns corresponding to the communication rank.

A method of obtaining a random $(N_t-1) \times (N_t-1)$ unitary matrix may be a method of generating a random $(N_t-1) \times 1$ vector and performing an SVD with respect to the random $(N_t-1) \times 1$ vector to obtain a random $(N_t-1) \times (N_t-1)$ unitary matrix.

Referring again to FIG. 6, in operation S630, the precoding matrix codebook generating method selects a group of columns corresponding to a communication rank from each of the unitary matrices that are elements of the second group so that the selected columns are optimized based on a distance between the columns corresponding to the communication rank.

When the communication rank is greater than or equal to 2 and less than $(N_t-1)$, the second group rather than the first group may have various types of distributions with respect to the distance between the columns corresponding to the communication rank. Accordingly, a group of columns optimized in the second group based on a distance between the columns corresponding to the communication rank may have an improved communication performance that is better than a communication performance of a group of columns optimized in the first group.

Referring again to FIG. 6, in the operation S630, the selecting of the group of columns may include selecting the group of columns corresponding to the communication rank from each of the unitary matrices that are elements of the second group so that the selected columns maximize a distance between the columns corresponding to the communication rank.

Generally, when a distance between columns included in a precoding codebook is maximized, the communication performance may be optimized.

FIG. 4 shows a predetermined selection procedure performed by a precoding matrix codebook generating method according to an aspect of the invention.

Referring to FIG. 4, the precoding matrix codebook generating method according to an aspect of the invention selects a group of optimized unitary matrices from a first 4×4 unitary matrix group 410 and a second 4×4 unitary matrix group 420. The unitary matrices are optimized based on a distance between columns corresponding to a communication rank. Also, the first 4×4 unitary matrix group 410 is obtained from the elements of the first group, and the second 4×4 unitary matrix group 420 is obtained from the first 4×4 unitary matrix group 410.

When the communication rank is 2, the precoding matrix codebook generating method calculates a distance between columns with respect to any set of two columns of each matrix as follows. Specifically, with respect to the first unitary matrix group 410, the precoding matrix codebook generating method may calculate a distance among a first 4×2 matrix consisting of a first column 4111 and a third column 4113 of a first matrix 411, a second 4×2 matrix consisting of a first column 4121 and a third column 4123 of a second matrix 412, and a third 4×2 matrix consisting of a first column 4131 and a third column 4133 of a third matrix 413. Also, with respect to the second unitary matrix group 420, the precoding matrix codebook generating method may calculate a distance among a first 4×2 matrix consisting of a first column 4211 and a third column 4213 of a first matrix 421, a second 4×2 matrix consisting of a first column 4221 and a third column 4223 of a second matrix 422, and a third 4×2 matrix consisting of a first column 4231 and a third column 4233 of a third matrix 423.

The precoding matrix codebook generating method finally selects a unitary matrix group having a minimum distance among the 4×2 matrices described above from the first unitary matrix group 410 and the second unitary matrix group 420. Also, the precoding matrix codebook generating method finally selects a group of three 4×2 matrices that consist of a first column and a third column of the selected unitary matrix group.

Referring again to FIG. 6, in the operation S630, the selecting of the group of columns may include selecting a predetermined number of candidate matrices from unitary matrices that are elements of the second group so that the candidate matrices maximize a distance between first columns of the candidate matrices, and selecting the group of columns corresponding to the communication rank from the predetermined number of candidate matrices so that the selected columns maximize a distance between the columns corresponding to the communication rank.

FIG. 5 shows a predetermined selection procedure performed by a precoding matrix codebook generating method according to an aspect of the invention.

Referring to FIG. 5, the precoding matrix codebook generating method according to an aspect of the invention calculates a distance among first columns 521, 531, 541, and 551 of unitary matrices 520, 530, 540, and 550 that are four elements of a second group 510, and selects two unitary matrices 520 and 550 having a maximum distance from the unitary matrices 520, 530, 540, and 550.

An number of the selected candidate matrices, such as 2 in example shown in FIG. 5, may be a predetermined value.

The number of the selected candidate matrices may be restricted by an amount of information that can be fed back from a terminal. The restriction is represented by Equation 3 described above.

The precoding matrix codebook generating method selects a group of columns corresponding to a communication rank. In the example shown in FIG. 5, the columns are selected from the columns of selected candidate matrices 560 so that the selected columns maximize a distance between the columns corresponding to the communication rank.

A computer-readable medium may be encoded with processing instructions for implementing a precoding matrix codebook generating method according to an aspect of the invention performed by a computer. The computer-readable medium may also be encoded with data files, data structures, and the like in addition to the processing instructions for implementing the precoding matrix codebook generating method. Examples of suitable computer-readable media include magnetic media such as hard disks, floppy disks, and magnetic tape; optical media such as CD-ROMs and DVDs; magneto-optical media such as magneto-optical disks; and hardware devices that are specially configured to store and perform processing instructions, such as read-only memory (ROM), random access memory (RAM), flash memory, and the like. The processing instructions may also be embodied as a computer data signal in a carrier wave for transmission over a transmission medium such as optical or metallic lines, waveguides, the Internet, air, space, and the like. The computer data signal may also include data files, data structures, and the like in addition to the processing instructions for implementing the precoding matrix codebook generating method. Examples of processing instructions include both machine code, such as machine code produced by a compiler, and higher level code that may be executed by the computer using an interpreter. The above-described hardware devices may be configured to act as one or more software modules to perform the operations of the above-described aspects of the invention.

An apparatus for and method of generating a precoding matrix codebook according to an aspect of the invention can extend a vector-based codebook to a precoding matrix codebook adaptable to a multi-rank system.

An apparatus for and method of generating a precoding matrix codebook according to an aspect of the invention can obtain a group of optimized beam vectors in a MIMO communication system.

An apparatus for and method of generating a precoding matrix codebook according to an aspect of the invention can reduce overhead and system complexity in a MIMO communication system for single or multiple users.

Although several embodiments of the invention have been shown and described, it would be appreciated by those skilled in the art that changes may be made in these embodiments without departing from the principles and spirit of the invention, the scope of which is defined by the claims and their equivalents.

What is claimed is:

1. An apparatus for generating a precoding matrix codebook, the apparatus comprising:
   a matrix group generator to generate a first group of unitary matrices based on a vector-based codebook for precoding of a multiple input multiple output (MIMO) communication scheme;
   a matrix group extender to extend the first group of unitary matrices to generate a second group of unitary matrices; and
   a matrix group selector to select a group of columns corresponding to a communication rank from each of the unitary matrices that are elements of the second group so that the selected columns are optimized based on a distance between the columns corresponding to the communication rank.

2. The apparatus of claim 1, wherein the matrix group extender generates the second group so that a reference column of a unitary matrix that is an element of the second group is identical to a reference column of a unitary matrix that is an element of the first group, and remaining columns of the unitary matrix that is an element of the second group are orthogonal to the reference column of the unitary matrix that is an element of the first group.

3. The apparatus of claim 2, wherein the remaining columns of the unitary matrix that is an element of the second group are obtained by multiplying an arbitrary unitary matrix by another matrix consisting of remaining columns of the unitary matrix that is an element of the first group.

4. The apparatus of claim 3, wherein the arbitrary unitary matrix is a random unitary matrix.

5. The apparatus of claim 3, wherein the multiplying of an arbitrary unitary matrix by another matrix consisting of remaining columns of the unitary matrix that is an element of the first group comprises rotating the other matrix consisting of remaining columns of the unitary matrix that is an element of the first group within a null space for the reference column of the unitary matrix that is an element of the first group.

6. The apparatus of claim 2, wherein the matrix group selector comprises an optimized columns selector to select the group of columns corresponding to the communication rank from each of the unitary matrices that are elements of the second group so that the selected columns maximize a distance between the columns corresponding to the communication rank.

7. The apparatus of claim 2, wherein the reference column of the unitary matrix that is an element of the first group is identical to a vector that is an element of the vector-based codebook, or a normalized form of the vector that is an element of the vector-based codebook.

8. The apparatus of claim 7, wherein the unitary matrix that is an element of the first group is obtained by performing a singular value decomposition with respect to the vector that is an element of the vector-based codebook, or the normalized form of the vector that is an element of the vector-based codebook.

9. The apparatus of claim 2, wherein the vector-based codebook has a distribution in which vectors that are elements of the vector-based codebook maximize a minimum distance between the vectors.

10. The apparatus of claim 2, wherein the matrix group selector comprises:
    a candidate matrix selector to select a predetermined number of candidate matrices from unitary matrices that are elements of the second group so that the candidate matrices maximize a distance between reference columns of the candidate matrices; and an optimized columns selector to select the group of columns corresponding to the communication rank from the predetermined number of candidate matrices so that the selected columns maximize a distance between the columns corresponding to the communication rank.

11. A method of generating a precoding matrix codebook, the method comprising:
generating a first group of unitary matrices based on a vector-based codebook for precoding of a multiple input multiple output (MIMO) communication scheme;
extending the first group of unitary matrices to generate a second group of unitary matrices; and
selecting a group of columns corresponding to a communication rank from each of the unitary matrices that are elements of the second group so that the selected columns are optimized based on a distance between the columns corresponding to the communication rank.

12. The method of claim 11, wherein the extending of the first group to generate a second group comprises generating the second group so that a reference column of a unitary matrix that is an element of the second group is identical to a reference column of a unitary matrix that is an element of the first group, and remaining columns of the unitary matrix that is an element of the second group are orthogonal to the reference column of the unitary matrix that is an element of the first group.

13. The method of claim 12, wherein the remaining columns of the unitary matrix that is an element of the second group are obtained by multiplying an arbitrary unitary matrix by another matrix consisting of remaining columns of the unitary matrix that is an element of the first group.

14. The method of claim 13, wherein the arbitrary unitary matrix is a random unitary matrix.

15. The method of claim 13, wherein the multiplying of an arbitrary unitary matrix by another matrix consisting of remaining columns of the unitary matrix that is an element of the first group comprises rotating the other matrix consisting of remaining columns of the unitary matrix that is an element of the first group within a null space for the reference column of the unitary matrix that is an element of the first group.

16. The method of claim 12, wherein the selecting of a group of columns comprises selecting the group of columns corresponding to the communication rank from each of the unitary matrices that are elements of the second group so that the selected columns maximize a distance between the columns corresponding to the communication rank.

17. The method of claim 12, wherein the reference column of the unitary matrix that is an element of the first group is identical to a vector that is an element of the vector-based codebook, or a normalized form of the vector that is an element of the vector-based codebook.

18. The method of claim 17, wherein the unitary matrix that is an element of the first group is obtained by performing a singular value decomposition with respect to the vector that is an element of the vector-based codebook, or the normalized form of the vector that is an element of the vector-based codebook.

19. The method of claim 12, wherein the vector-based codebook has a distribution in which vectors that are elements of the vector-based codebook maximize a minimum distance between the vectors.

20. The method of claim 12, wherein the selecting of a group of columns comprises:
selecting a predetermined number of candidate matrices from unitary matrices that are elements of the second group so that the candidate matrices maximize a distance between reference columns of the candidate matrices; and
selecting the group of columns corresponding to the communication rank from the predetermined number of candidate matrices so that the selected columns maximize a distance between the columns corresponding to the communication rank.

21. A non-transitory computer-readable medium encoded with processing instructions for implementing a method of generating a precoding matrix codebook performed by a computer, the method comprising:
generating a first group of unitary matrices based on a vector-based codebook for precoding of a multiple input multiple output (MIMO) communication scheme;
extending the first group of unitary matrices to generate a second group of unitary matrices; and
selecting a group of columns corresponding to a communication rank from each of the unitary matrices that are elements of the second group so that the selected columns are optimized based on a distance between the columns corresponding to the communication rank.

* * * * *